G. HOLINKA.
AUTOMOBILE SIGNAL LAMP.
APPLICATION FILED DEC. 11, 1913.
1,090,853.  Patented Mar. 24, 1914.
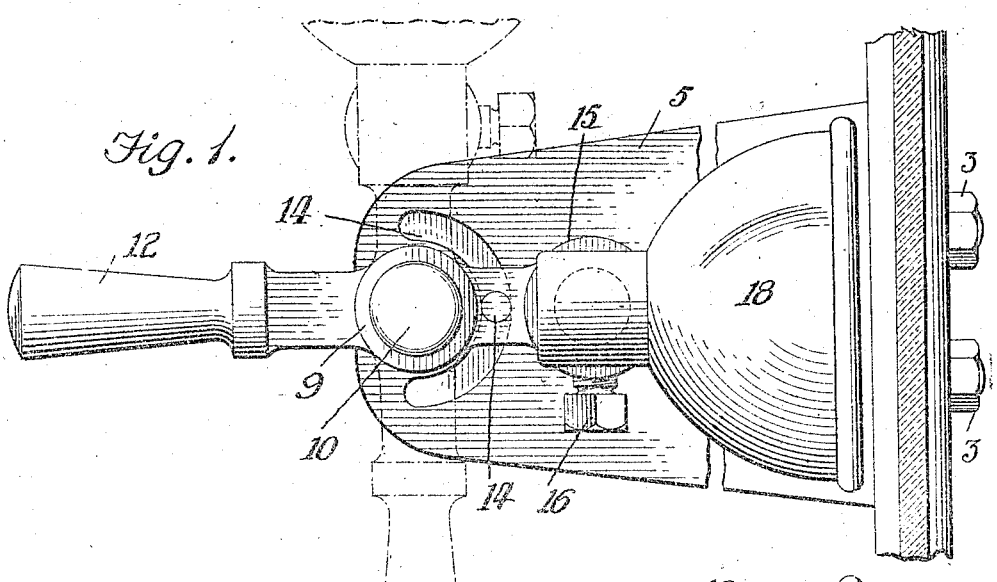
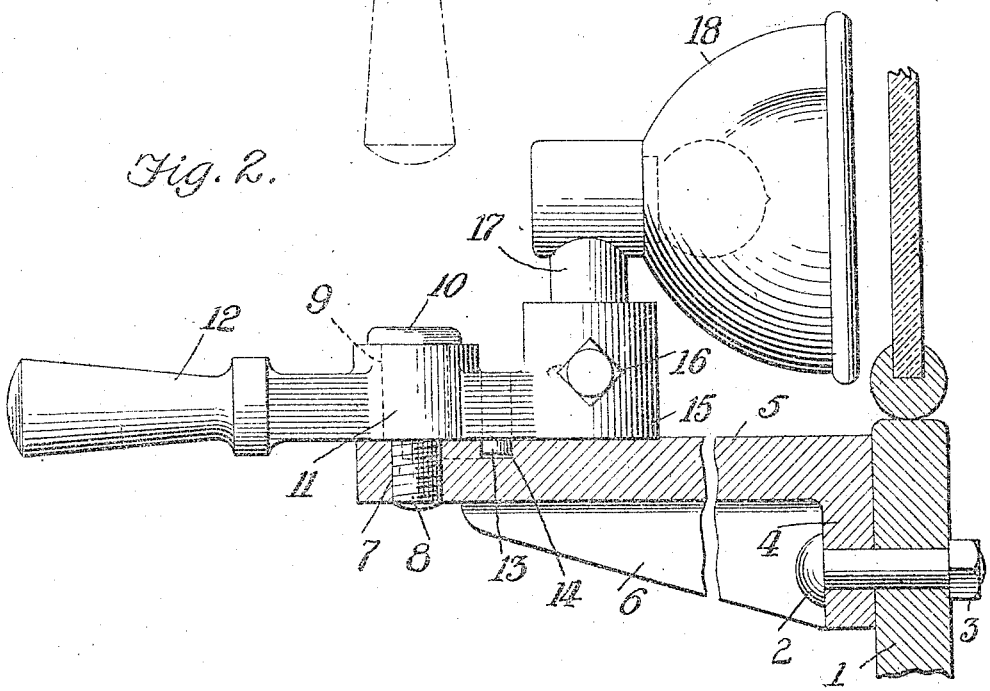
Inventor
George Holinka,
Witnesses
Chas. W. Stauffer
Karl S. Butler
By
Attorney

UNITED STATES PATENT OFFICE.

GEORGE HOLINKA, OF DETROIT, MICHIGAN.

AUTOMOBILE SIGNAL-LAMP.

1,090,853.

Specification of Letters Patent. Patented Mar. 24, 1914.

Application filed December 11, 1913. Serial No. 806,016.

*To all whom it may concern:*

Be it known that I, GEORGE HOLINKA, a citizen of the United States of America, residing at Detroit, in the county of Wayne and State of Michigan, have invented certain new and useful Improvements in Automobile Signal-Lamps, of which the following is a specification, reference being had therein to the accompanying drawings.

In order that an automobile lamp can be used for signaling purposes, I have devised a novel bracket for safely supporting an automobile lamp whereby it can be easily and quickly shifted to various positions to indicate direction of travel or for "wigwagging" a message from one automobile to another.

The bracket is suitably secured to the dash board of an automobile or other vehicle and is provided with a pivoted lamp holder for a suitable lamp, the holder being arranged whereby it can be easily and quickly swung from one side of the bracket to the other, thus positioning the lamp for one signal or another.

The invention will be hereinafter specifically described and then claimed, and reference will now be had to the drawing, wherein, Figure 1 is a plan of the automobile signal lamp, and Fig. 2 is a side elevation of the same.

In the drawing, the reference numeral 1 denotes a portion of a dash board or other support and connected to the rear side thereof by bolts 2, nuts 3 or other fastening means is the end 4 of a horizontal bracket 5, said bracket having the bottom side thereof provided with stiffening webs or ribs 6, which are arranged at the sides of the bracket and formed integral with the end 4 thereof. The outer end of the bracket 5 has a central vertical opening 7 with the walls thereof screw threaded to receive the screw threaded shank 8 of a vertical post 9, said post bearing upon the upper surface of the bracket and having a head 10. Pivotally mounted upon the post 9 is the central enlarged portion 11 of an operating lever 12, said lever protruding from the end of the bracket whereby it can be easily gripped and swung in a horizontal plane. The enlarged portion 11 of said lever has a depending pin or stop 13, which extends into a segment-shaped groove 14 provided therefor in the upper surface of the bracket 5. The groove 14 is described upon an arc having for its radial center the post 9, and the ends of the groove form stops for the pin 13 and limit the horizontal movement of the lever 12 relatively to the bracket 5.

The forward end of the lever 12 terminates in a lamp holder in the form of a socket 15 having a set screw 16 for retaining the stem 17 of a lamp 18 in engagement with said holder. The lamp 18 may be of any of the well known type used in connection with automobiles.

As illustrated in Fig. 1 of the drawing, the lamp is set dead ahead as a head light signal or for casting rays of light in the path traveled by an automobile or other vehicle equipped with the signal lamp. The lamp has been shown as shifted to one side by dotted lines and it is possible to swing the lamp either to the right or left and in this manner signal the direction of travel to approaching vehicles or pedestrians, or to cast rays of light to one side or the other for observation purposes.

From the foregoing it will be observed that I have devised a simple, inexpensive and durable accessory for automobiles and other vehicles, and while in the drawing there is illustrated a preferred embodiment of the invention, it is to be understood that the structural elements are susceptible to such variations and modifications as fall within the scope of the appended claim.

What I claim is:—

In an automobile signal lamp, a horizontally disposed bracket, a post carried thereby, an operating lever pivotally mounted upon said post, a lamp holder carried by said lever, and a depending pin carried by said lever and adapted to engage in said bracket for limiting a movement of said lever thereon.

In testimony whereof I affix my signature in presence of two witnesses.

GEORGE HOLINKA.

Witnesses:
ANNA M. DORR,
KARL H. BUTLER.